US008654420B2

(12) United States Patent
Simmonds

(10) Patent No.: US 8,654,420 B2
(45) Date of Patent: Feb. 18, 2014

(54) WAVEGUIDES

(75) Inventor: Michael David Simmonds, Rochester (GB)

(73) Assignee: BAE Systems PLC (GB)

( * ) Notice: Subject to any disclaimer, the term of this patent is extended or adjusted under 35 U.S.C. 154(b) by 0 days.

(21) Appl. No.: 13/133,628

(22) PCT Filed: Dec. 10, 2009

(86) PCT No.: PCT/GB2009/051682
§ 371 (c)(1),
(2), (4) Date: Jun. 8, 2011

(87) PCT Pub. No.: WO2010/067117
PCT Pub. Date: Jun. 17, 2010

(65) Prior Publication Data
US 2011/0242670 A1    Oct. 6, 2011

(30) Foreign Application Priority Data

Dec. 12, 2008  (EP) .................................... 08275085
Dec. 12, 2008  (GB) .................................... 0822684.7

(51) Int. Cl.
*G03H 1/00*     (2006.01)
*G02B 27/10*    (2006.01)
*G02B 27/01*    (2006.01)

(52) U.S. Cl.
CPC .................................... *G02B 27/01* (2013.01)
USPC ........................................... 359/13; 359/630

(58) Field of Classification Search
USPC .................................... 359/13, 630
See application file for complete search history.

(56) References Cited

U.S. PATENT DOCUMENTS

| 3,806,223 | A   |   | 4/1974  | Keck et al.              |
|-----------|-----|---|---------|--------------------------|
| 6,139,176 | A   | * | 10/2000 | Hulse et al. ..... 362/581|
| 6,685,325 | B1  | * | 2/2004  | Hulse et al. ..... 359/879|
| 6,832,037 | B2  | * | 12/2004 | Aylward et al. ... 385/145|
| 6,908,872 | B2  | * | 6/2005  | Tanaka et al. .... 501/135|
| 7,016,587 | B2  | * | 3/2006  | Kubby et al. ..... 385/129|
| 7,068,871 | B2  | * | 6/2006  | Sugama et al. .... 385/14 |

(Continued)

FOREIGN PATENT DOCUMENTS

EP   0077193 A    4/1983
GB   2388673 A    11/2003

(Continued)

OTHER PUBLICATIONS

Search Report in related European application No. 08275085.2 mailed Jun. 26, 2009.

(Continued)

*Primary Examiner* — Scott J Sugarman
*Assistant Examiner* — Robert E Tallman
(74) *Attorney, Agent, or Firm* — Pillsbury Winthrop Shaw Pittman LLP

(57) ABSTRACT

A waveguide 112 includes a substrate of material 134 having optical layers 148, 152 applied to two external surfaces 146, 150. This reduces the critical angle c5 of the substrate of material 134 to provide greater interaction between image bearing light following a light path 140 and a grating element 142 and/or a greater total field of view 160, when compared to the total field of view 132 of a prior art waveguide 110, that is capable of being transmitted by the waveguide 112. Such a waveguide 112 can be used in a projection display.

14 Claims, 6 Drawing Sheets

(56) References Cited

U.S. PATENT DOCUMENTS

| | | | |
|---|---|---|---|
| 7,205,960 B2 * | 4/2007 | David | 345/7 |
| 2004/0024078 A1 | 2/2004 | Itoh et al. | |
| 2004/0025294 A1 | 2/2004 | Gruber | |
| 2004/0174348 A1 | 9/2004 | David | |
| 2008/0138013 A1 | 6/2008 | Parriaux | |

FOREIGN PATENT DOCUMENTS

| | | |
|---|---|---|
| WO | 0109663 A | 2/2001 |
| WO | 03081320 A | 10/2003 |
| WO | 2007029032 A | 3/2007 |
| WO | 2007029034 A1 | 3/2007 |
| WO | 02/08806 A2 | 6/2011 |

OTHER PUBLICATIONS

International Search Report in related application PCT/GB2009/051682 mailed May 17, 2010.

Search Report in related British application No. 0822684.7 mailed Mar. 30, 2009.

International Preliminary Report on Patentability in related application PCT/GB2009/051682 mailed Jun. 23, 2011.

* cited by examiner

FIG. 8
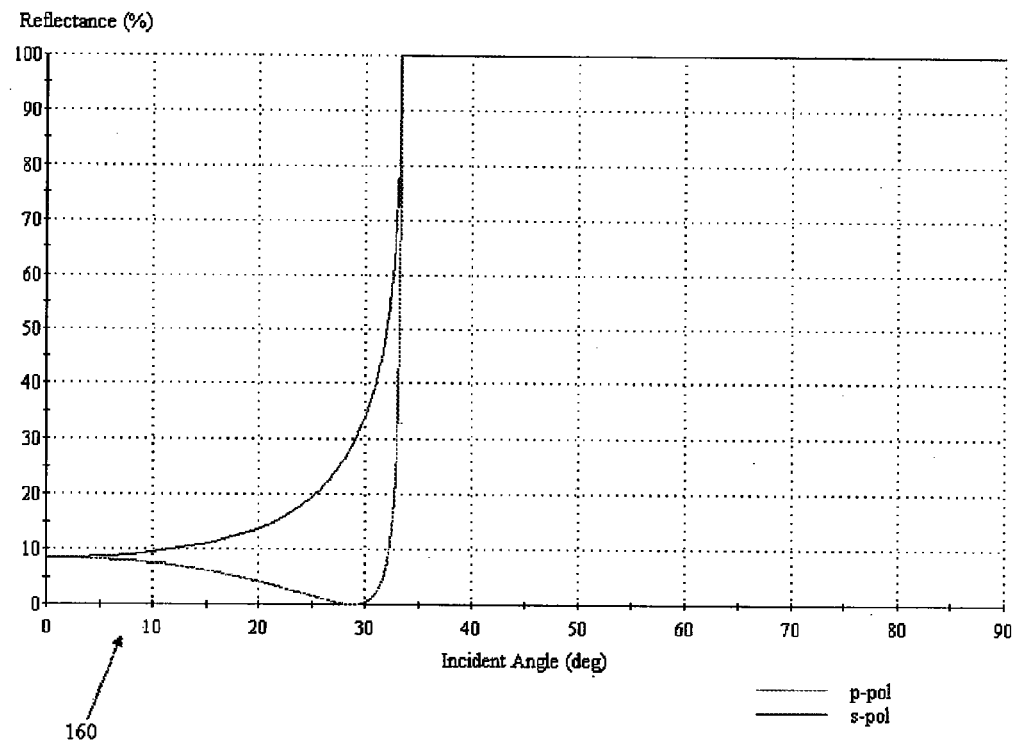
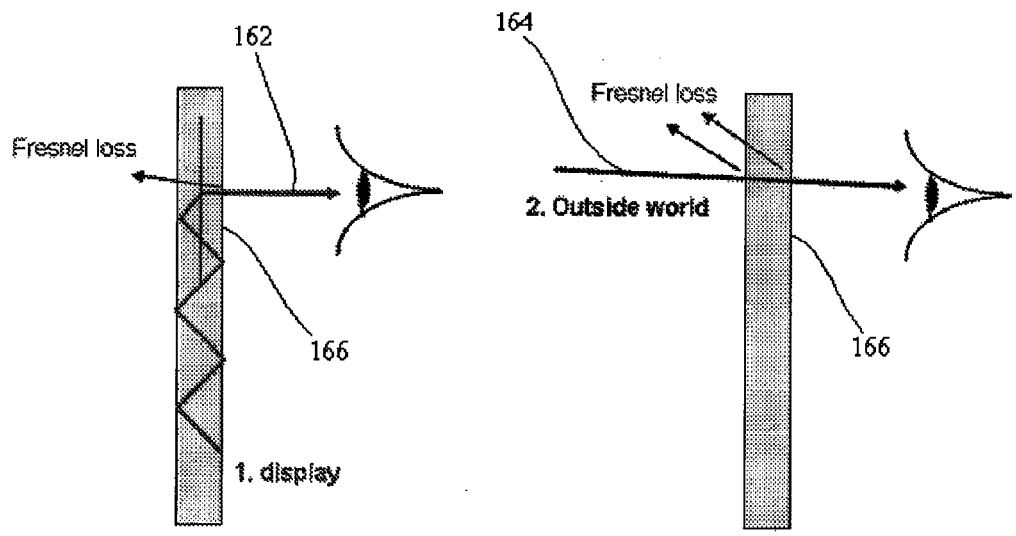
FIG. 9

WAVEGUIDES

CROSS REFERENCE TO RELATED APPLICATIONS

This is the U.S. National Phase of PCT/GB2009/051682, filed Dec. 10, 2009, which claims priority to British Patent Application No. 0822684.7, filed Dec. 12, 2008 and European Patent Application No. 08275085.2 filed Dec. 12, 2008, each of which are incorporated by reference herein in their entireties.

This invention relates to a waveguide and a projection display for displaying an image to an observer, which is particularly, but not exclusively, suitable for use in a head up display, a helmet mounted display or head mounted display.

Referring to FIGS. 1 and 2, wherein like references have been used to indicate similar integers, prior art International patent application publication number WO2007/029032 teaches a projection display 10 for displaying an image to an observer 12 that uses waveguide techniques to generate a collimated display defining a large exit pupil at the point of the observer 12 and a large field of view, whilst using a small image-providing light source device. The projection display 10 uses a first plate-like waveguide 14 made of light transmissive material such as glass or plastic and a second plate-like waveguide 16 made from a light transmissive and light transparent material such as glass or plastic. The projection display 10 additionally includes an image-providing light source device, not shown, located to inject image bearing light into the first plate-like waveguide 14 through a first face 18.

The image-providing light source device includes a micro-display arranged to provide information to be displayed to the observer 12. Additionally the image-providing light source device includes a collimating optical arrangement located between the micro-display and the first face 18 of the first plate-like waveguide 14. The collimating optical arrangement is operable to collimate light received from the micro-display and to inject the collimated image bearing light into the first plate-like waveguide 14 through the first face 18.

The collimated image bearing light produced by the collimating optical arrangement has a small exit pupil and is fed into the first plate-like waveguide 14, which performs the function of stretching the horizontal pupil of the final display. The output from the first plate-like waveguide 14 is fed into the second plate-like waveguide 16, which is arranged to stretch the vertical pupil of the final display and also to act as a combiner for the projection display 10 through which the observer 12 views an outside world scene 20 along a line of sight 22 of the observer 12 through the second plate-like waveguide 16 with information to be displayed to the observer 12 overlaid on the outside world scene 20. In this manner, the image to be displayed to the observer 12 looking through the second plate-like waveguide 16 defines a large exit pupil and a large field of view whilst using a small image generating light source.

Image bearing light injected into first plate-like waveguide 14, via first face 18 is incident on a first grating 24 arranged internally within the first plate-like waveguide 14 and substantially parallel with the first face 18. Light impinging on the first grating 24 diffracts therefrom such that the incidence angle of the light on the internal surfaces of the first plate-like waveguide 14 is greater than the critical angle for the material from which the first plate-like waveguide 14 is made. The image bearing light is constrained within the first plate-like waveguide 14 to propagate along the first plate-like waveguide 14 reflecting from each internal surface in turn to follow a predefined light path 26. Thus, the relative field angles of the light incident on the first plate-like waveguide 14 at the first face 18 are preserved within the first plate-like waveguide 14 and the information required to regenerate the original image is preserved.

The first grating 24 also serves to radiate the image bearing light out of the first plate-like waveguide 14. The first grating 24 is a low efficiency grating which diffracts a small amount of light out of the first plate-like waveguide 14 on each interaction with incident image bearing light.

The second plate-like waveguide 16 is located with a first face 28 parallel with a second face 30 of the first plate-like waveguide 14 and is arranged to receive the image bearing light exiting the second face 30 of the first plate-like waveguide 14. The second face 30 is parallel to the first face 18 of the first plate-like waveguide 14. The first face 28 of the second plate-like waveguide 16 is located adjacent and close to the second face 30 of the first plate-like waveguide 14. The second plate-like waveguide 16 includes a second grating 32 located therein arranged substantially parallel to the first face 28 of the second plate-like waveguide 16 and the second grating 32 is operable to diffract each impinging ray of image bearing light received from the first grating 24 of the first plate-like waveguide 14 at an angle that is larger than the critical angle for the material from which the second plate-like waveguide 16 is made. Accordingly, received image bearing light will propagate inside the second plate-like waveguide 16 to follow the predefined light path 26. The image bearing light continues along the light path 26 to a third grating 34 arranged on or within the second plate-like waveguide 16, which is arranged to diffract the received image bearing light out of the second plate-like waveguide 16 towards the observer 12.

The second grating 32 is arranged such that its diffractive power is rotated through 90 degrees to that of the diffractive power of the first grating 24 to rotate incident image bearing light towards the third grating 34.

The third grating 34 is a low efficiency grating, such that as image bearing light propagates along the light path 26 within the second plate-like waveguide 16, each interaction with the third grating 34 causes a small proportion of the image bearing light to be diffracted out of the second plate-like waveguide 16. Image bearing light which is not diffracted out of the second plate-like waveguide 16 continues to propagate within the second plate-like waveguide 16. Accordingly, a large number of parallel rays of image bearing light exit the second plate-like waveguide 16 through the third grating 34 towards the observer 12, which originated at discrete points on the micro-display forming the image generating light source device. As the relative field angles of the image bearing light have been preserved within the first and second plate-like waveguides 14, 16, the correct image to be conveyed to the observer 12 is presented for viewing when the observer 12 views an outside world scene 20 through the second plate-like waveguide 16.

According to a first aspect of the invention a waveguide for a projection display, includes: a substrate of light transmissive material having two opposed substantially parallel faces, the substrate of material being arranged to transmit light within the substrate of material, between the parallel faces, under total internal reflection; an output grating element arranged within the substrate of material to diffract a portion of light incident thereon out of the substrate of material and to allow the remainder of the light to be transmitted within the substrate of material under total internal reflection; and an optical layer arranged on each of the parallel faces, the optical layer being arranged to reduce the critical angle required for total internal reflection of light within the substrate of material so that the number of interactions between light transmitted within the substrate and the grating element can be increased.

In this manner, the critical angle to enable total internal reflection of light within the waveguide is reduced. Furthermore, the total field of view capable of transmission by the waveguide is increased.

Means such as a light source or other waveguide can input light into the substrate at angles of incidence relative to the substantially parallel faces which are between a critical angle of the substrate without the optical layer (i.e. as in the prior art) and a reduced critical angle of the substrate with the optical layer.

The optical layer may be selected to reduce Fresnel reflectance of light at the faces of the substrate having an angle of incidence which is between the critical angle of the substrate with the optical layer and a normal axis when light is diffracted out of the substrate by the output grating element.

The optical layer may comprise a plurality of layers in which alternate layers have relatively high and relatively low refractive indices. In this case, the or each relatively high refractive index layer may be made from TiO2 and/or the or each relatively low refractive index layer may be made from MgF2.

According to another aspect of the invention a projection display, for displaying an image to an observer, includes: first and second waveguides as described above in relation to the present invention; an image-providing light source device arranged to generate an image and to inject image bearing light into the first waveguide; a first said output grating element associated with the first waveguide arranged to direct the image bearing light internally along the first waveguide under total internal reflection and via which the image bearing light is outputted from the first waveguide; an input grating element arranged to receive the image bearing light from the first waveguide and to inject the image bearing light along the second waveguide under total internal reflection; and a second said output grating element arranged in the second waveguide to diffract received image bearing light out of the second waveguide towards an observer; wherein the optical layers of the first and second waveguides reduce the critical angle required for total internal reflection of image bearing light within the waveguides to increase the number of interactions between the light propagating within the first waveguide and the first output grating element and between the light propagating within the second waveguide and the second output grating element.

In this manner, the critical angle to enable total internal reflection of light within the first and/or second the waveguide is reduced. Furthermore, the total field of view capable of transmission within the projection display is increased.

The first and second output grating elements may be arranged to diffract a portion of image bearing light incident thereon out of the associated waveguide element and to allow the remainder of the image bearing light to be transmitted within the associated waveguide element under total internal reflection.

As the critical angle of the first and second waveguide elements has been reduced, the number of interactions between image bearing light and the grating element per unit length of the grating element is increased.

Each optical layer may be an optical coating applied to the associated parallel face.

One or more of the grating elements may be holographic optical elements or semi-reflective surfaces.

The first waveguide element may be plate-like, the second waveguide element may plate-like and the first and second waveguide elements may be arranged substantially parallel to one another.

Alternatively, the first waveguide element and the second waveguide element may be arranged substantially in the same plane. The first waveguide element and the second waveguide element may be formed within a single piece of material.

As a further alternative, the first waveguide element may be rod-like, the second waveguide element may be plate-like and the first and second waveguide elements may be arranged such the image bearing light exits the first waveguide element along a longitudinal axis of the first waveguide element and enters the second waveguide element to propagate along a propagation axis of the second waveguide element.

The waveguide and/or the projection display of the invention may be included in a Head Up Display, or Helmet Mounted Display, or Head Mounted Display.

The invention will now be described, by way of example only, with reference to the accompanying drawings, in which:

FIG. 8 illustrates in more detail a graph of the internal reflection response curve and Fresnel reflectance for a prior art waveguide;

FIG. 9 illustrates schematically reflectance losses in a prior art waveguide in both the device image and an outside world scene;

Figure 3:
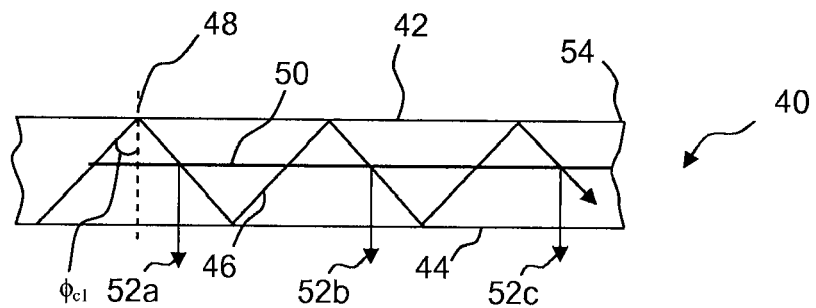
FIG. 3 illustrates, in elevation view, a waveguide according to the prior art.

Referring to FIG. 3, there is shown a waveguide 40 formed from a substrate of material, comprising a first internal face 42 and a second internal face 44 parallely spaced from one another. The waveguide 40 is arranged to total internally reflect injected light along a light path 46 between the first and second faces 42, 44. In order to achieve total internal reflection of light along the light path 46, injected light is arranged to enter the waveguide 40 at greater than the critical angle $\phi_{c1}$ for the substrate of material from which the waveguide 40 is formed, as measured from a normal axis 48 to the waveguide 40.

A grating element 50 carried within the layer of material of the waveguide 60 is arranged such that impinging light following the light path 46 is either diffracted out of the waveguide 60 as a pupil of image bearing light 52a to 52c, for viewing by the observer, or the image bearing light passes through the grating element 50 and is reflected by either the first internal face 42 or the second internal face 44 of the waveguide 40 so as to propagate further along the waveguide 40 towards a distal end 54. Accordingly, the light internally reflected within the waveguide 40 will impinge on the grating element 50 further along the light path 46.

Figure 4:
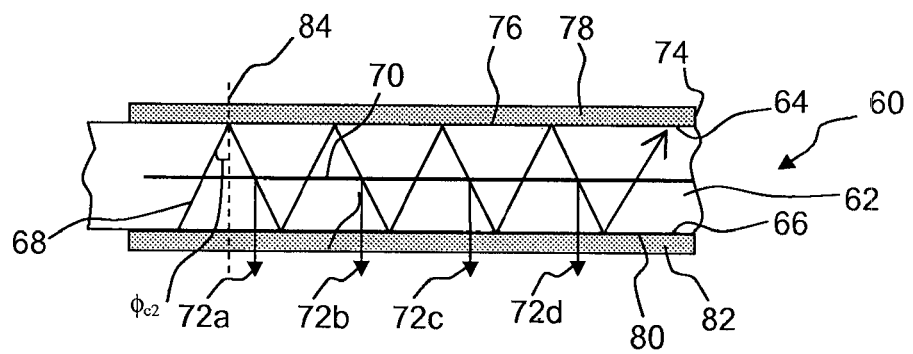
FIG. 4 illustrates, in elevation view, a waveguide according to the present invention.

Referring to FIG. 4, there is shown a waveguide 60 including a substrate of material 62, which has a first internal face 64 and a second internal face 66 parallely spaced from one another and arranged to allow propagation of image bearing light along a propagation axis to follow a light path 68 within the substrate of material 62 by total internal reflection of the image bearing light. The substrate of material 62 is a light transparent material arranged to allow an observer, not illustrated, to look through the substrate of material 62 whilst also arranged to carry image bearing light to provide a display image to the observer overlaid on a forward scene viewed through the waveguide 60.

A grating element 70 carried within the substrate of material 62 is arranged to interact with the light such that impinging image bearing light following the light path 68 is either diffracted out of the substrate of material 62 as a pupil of image bearing light 72a to 72d for viewing by the observer, or the image bearing light passes through the grating element 70 and is internally reflected by either the first or second internal face 70, 72 of the substrate of material 62 so as to propagate further along the light path 68 towards a distal end 74. Accordingly, the image bearing light internally reflected within the substrate of material 62 will impinge on the grating element 70 further along the light path 68.

A first external surface 76 of the substrate of material 62 is coated with an optical layer 78 and a second external surface 80 of the substrate of material 62 is coated with an optical layer 82. The optical layers 80, 82 are arranged such that they reduce the critical angle $\phi_{c2}$ required for total internal reflection of image bearing light within the substrate of material 62, as measured from a normal axis 84 to the waveguide 60. The optical layers 78 and 82 can be formed from using a dielectric thin film coating.

Figure 5:
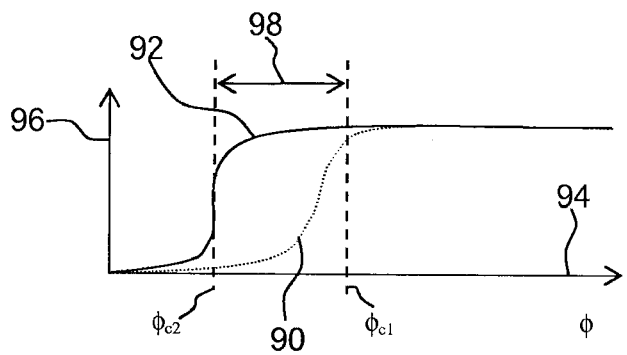
FIG. 5 illustrates a graph of the internal reflection response curve for a prior art waveguide and a waveguide according to the present invention.

Referring to FIG. 5, which provides a comparison of the angle $\phi$ that image bearing light is injected into a prior art waveguide 40, as indicated by line 90, and injected into a waveguide 60 according to the present invention, as indicated by line 92, along the abscissa 94, against the light internally reflected within the waveguides 40, 92, along the ordinate 96. It will be observed from a comparison of the response curves for the prior art waveguide 40 and the waveguide 60 of the present invention, lines 90 and 92, that the prior art waveguide 40 will provide a critical angle $\phi_{c1}$ that is greater than the critical angle $\phi_{c2}$ provided by the waveguide 60 according to the present invention.

The difference between the two critical angles $\phi_{c1}$ and $\phi_{c2}$, indicated by double arrow 98, provides the waveguide 60 with an advantage of being able to be used for a greater angular range of injected image bearing light than the prior art waveguide 40. Furthermore, and as observed from a comparison of FIGS. 3 and 4, as the critical angle $\phi_{c2}$ for injecting image bearing light has been reduced, the image bearing light will interact with the grating element 70 more often than that of the prior art described with reference to FIG. 3. Accordingly, more pupils of image bearing light 72a to 72d will exit the waveguide 60, thereby mitigating pupil banding as perceived by the observer.

Figure 6:
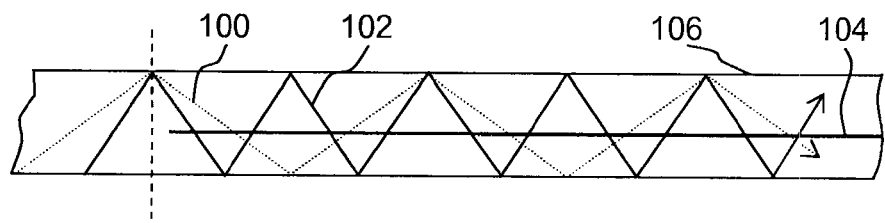
FIG. 6 illustrates, in elevation view, a waveguide showing total internal reflection of light for the prior art and the present invention.

Referring to FIG. 6, a comparison of the light path 100 as provided by the prior art waveguide and the light path 102 as provide by the waveguide of the present invention indicates that light interacts with a grating element 104 more often as the critical angle for total internal reflection within a waveguide 106 decreases.

It will be understood that the injection of image bearing light into the waveguide 60 can be via one or more reflective, transmissive or refractive optical elements. Furthermore, the grating element 70 can be reflective, thereby being arranged on or near one surface 64 or 66, or transmissive, thereby being arranged towards the centre of the waveguide 60.

Figure 1:
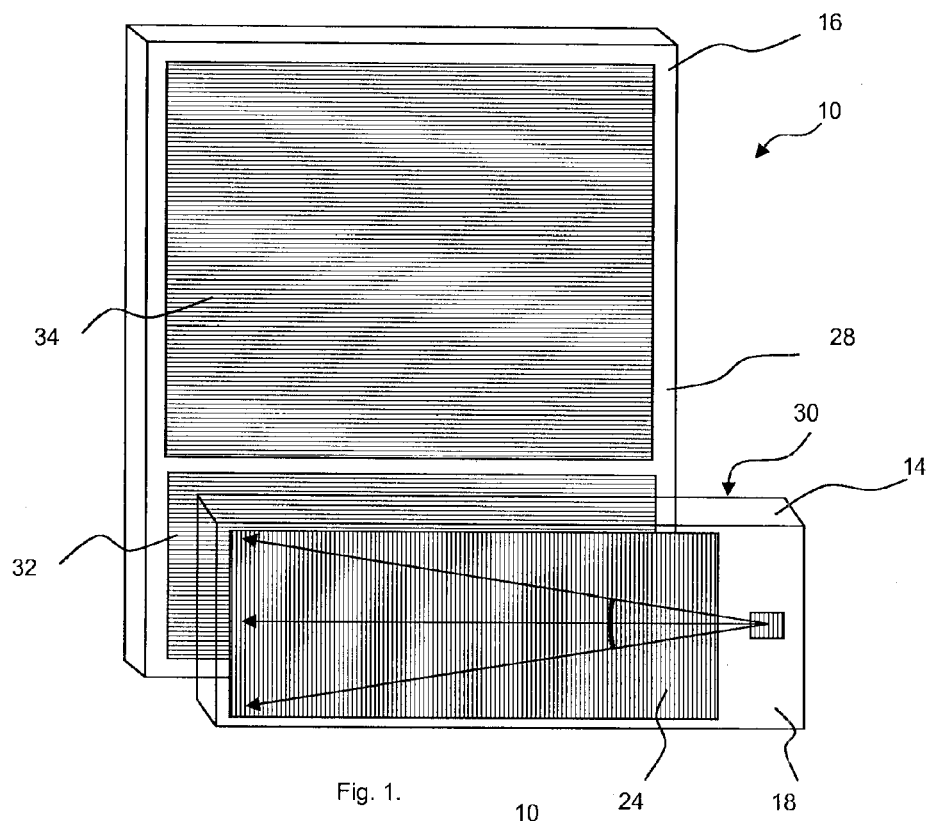
FIG. 1 illustrates, in perspective view, a prior art projection display including parallel waveguides.
Figure 2:
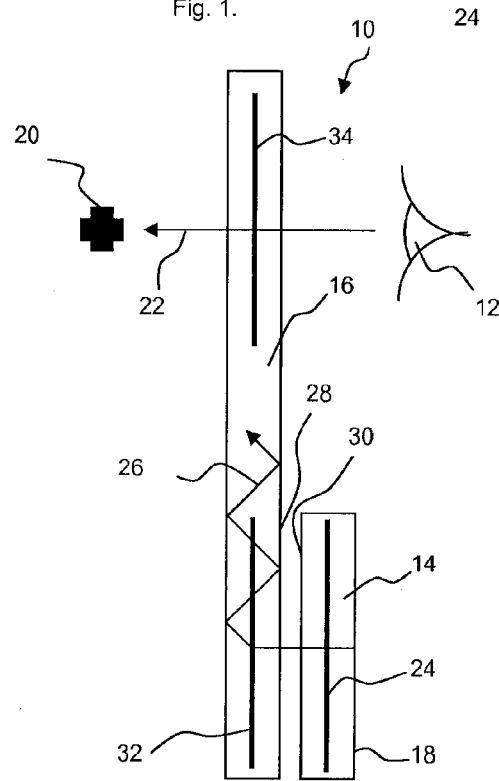
FIG. 2 illustrates, in elevation view, the prior art projection display of FIG. 1.

Such a waveguide 60 can be used in a projection display, for displaying an image to an observer, such as that described with reference to FIGS. 1 and 2 to correct irregularity of the intensity of image bearing light from the first grating 24 of the first plate-like waveguide 14 and/or the third grating 34 of the second plate-like waveguide 16.

Figure 7:
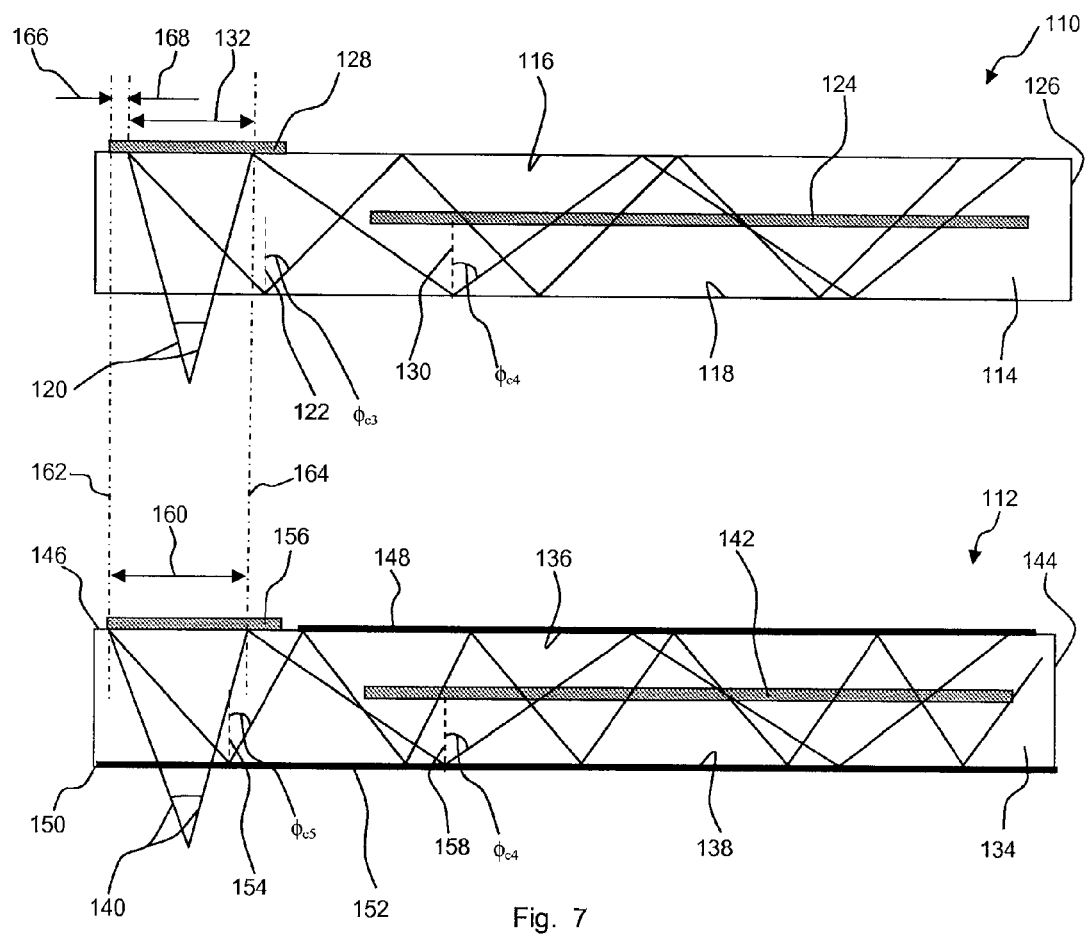
FIG. 7 illustrates in elevation view a comparison of the field of view of a prior art waveguide with a waveguide of the present invention.

Referring to FIG. 7 there is shown a prior art waveguide 110 compared to a waveguide 112 according to the present invention. Prior art waveguide 110 is formed from a layer of material 114, comprising a first internal face 116 and a second internal face 118 parallely spaced from one another. The waveguide 110 is arranged to total internally reflect injected light along a light path 120 between the first and second faces 116, 118. In order to achieve total internal reflection of light along the light path 120, injected light is arranged to enter the waveguide 110 at greater than the critical angle $\phi_{c3}$ for the layer of material 114 from which the waveguide 110 is formed, as measured from a normal axis 122 to the waveguide 110.

A grating element 124 carried within the layer of material 114 of the waveguide 110 is arranged such that impinging light following the light path 120 is either diffracted out of the waveguide 110 as a pupil of image bearing light, as previously described with reference to FIG. 3, for viewing by the observer, or the image bearing light passes through the grating element 124 and is reflected by either the first internal face 116 or the second internal face 118 of the waveguide 110 so as to propagate further along the waveguide 110 towards a distal end 126. Accordingly, the light internally reflected within the waveguide 110 will impinge on the grating element 124 further along the light path 120.

Light injected into the waveguide 110 is arranged to impinge on an optical element 128 arranged on or within the substrate of material 114 that is arranged to reflect the light such that it follows the light path 120. The minimum angle for $\phi_{c3}$ is dependent on the critical angle for the substrate of material 114. A maximum angle $\phi_{c4}$, as measured from a normal axis 130 to the waveguide 110, for light injected into the waveguide 110 is dependent upon the desired interaction between light following the light path 120 and the grating element 124 and the period between pupils associated with light exiting the waveguide 110, which in turn determines perceived pupil banding. Accordingly, the angles $\phi_{c3}$ and $\phi_{c4}$ determine the total field of view 132 of the image transmitted by the waveguide 110.

This is to be compared to the waveguide 112 of the present invention, which includes a substrate of material 134, which has a first internal face 136 and a second internal face 138 parallely spaced from one another and arranged to allow propagation of image bearing light along a propagation axis to follow a light path 140 within the substrate of material 134 by total internal reflection of the image bearing light. The substrate of material 134 is a light transparent material arranged to allow an observer, not illustrated, to look through the substrate of material 134 whilst also arranged to carry image bearing light to provide a display image to the observer overlaid on a forward scene viewed through the waveguide 112.

A grating element 142 carried within the substrate of material 134 is arranged such that impinging image bearing light following the light path 140 is either diffracted out of the substrate of material 134 as a pupil of image bearing light, as previously described with reference to FIG. 4, for viewing by the observer, or the image bearing light passes through the grating element 142 and is internally reflected by either the first or second internal face 136, 138 of the substrate of material 134 so as to propagate further along the light path 140 towards a distal end 144. Accordingly, the image bearing light internally reflected within the substrate of material 134 will impinge on the grating element 142 further along the light path 140.

A first external surface 146 of the substrate of material 134 is coated with an optical layer 148 and a second external surface 150 of the substrate of material 134 is coated with an optical layer 152. The optical layers 148, 152 are arranged such that they reduce the critical angle $\phi_{c5}$ required for total internal reflection of image bearing light within the substrate of material 134, as measured from a normal axis 154 to the waveguide 112. The optical layers 148 and 152 can be formed from using a dielectric thin film coating.

Image bearing light injected into the waveguide 112 is arranged to impinge on an optical element 156 arranged on or within the substrate of material 134 that is arranged to reflect the image bearing light such that it follows the light path 140. The minimum angle for $\phi_{c5}$ is dependent on the critical angle for the substrate of material 134 as reduced by the addition of optical layers 148, 152. As for prior art waveguide 110, the maximum angle $\phi_{c4}$, as measured from a normal axis 158 to the waveguide 112, for light injected into the waveguide 112 is dependent upon the desired interaction between image bearing light following the light path 140 and the grating element 142 and the period between pupils associated with image bearing light exiting the waveguide 112, which in turn determines perceived pupil banding. Accordingly, the angles $\phi_{c4}$ and $\phi_{c5}$ determine the total field of view 160 of the image transmitted by the waveguide 112.

As will be noted from chained lines 162 and 164 and double arrows 166 and 168, the total field of view 160 of waveguide 112 is greater than the total field of view 132 of prior art waveguide 110. The increased total field of view 160 is provided by the reduced critical angle $\phi_{c5}$ provided by optical layers 148, 152.

It will be understood that the injection of image bearing light into the waveguide 112 can be via one or more reflective, transmissive or refractive optical elements. Furthermore, the grating element 142 can be reflective, thereby being arranged on or near one surface 136 or 138, or transmissive, thereby being arranged towards the centre of the waveguide 112.

Such a waveguide 112 can be used in a projection display, for displaying an image to an observer, such as that described with reference to FIGS. 1 and 2 to correct irregularity of the intensity of image bearing light from the first grating 24 of the first plate-like waveguide 14 and/or the third grating 34 of the second plate-like waveguide 16 and/or to increase the field of view of such a projection display.

In a known waveguide according to the prior art, total internal reflection occurs when the angle of incidence of a light ray impinging on a parallel surface of the waveguide is above the critical angle. However, as shown in the graph of FIG. 8, below the critical angle a small amount of reflection still occurs in angular region 160 at angles close to the normal axis. The reflection losses are due to Fresnel reflection in high refractive index waveguide material at the waveguide/air boundary, and reduce the amount of image bearing light which is received by a viewer. As shown diagrammatically in FIG. 9, Fresnel reflection losses at the waveguide/air boundary 166 occur both in the image bearing light 162 which is coupled out of the waveguide by the output diffraction grating and also in the light 164 transmitted through the waveguide, acting as a combiner, from an outside world scene.

Figure 10:
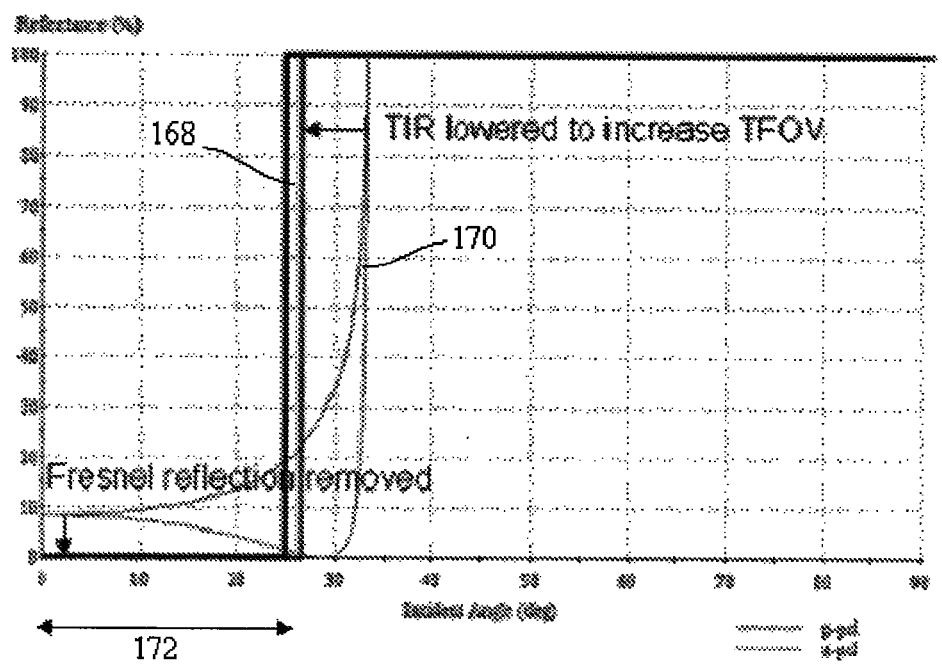
FIG. 10 illustrates in more detail a graph of the internal reflection response curve and Fresnel reflectance for a waveguide embodying the invention.

In embodiments of the invention, a coating is applied to the surface of the or each waveguide to decrease the critical angle at which total internal reflection occurs in order to increase the number of interactions between image bearing light and an output diffraction grating over a unit length of the grating. FIG. 10 shows the reduction in the critical angle, which in this example is from about 33° to about 25°. In this regard, the image bearing light undergoing total internal reflection in the coated waveguide is indicated by numeral 168, in both p and s polarisations, whereas the image bearing light undergoing total internal reflection in the prior art waveguide is indicated by numeral 170. Accordingly, the coated waveguide can increase the number of interactions with the output grating.

Additionally, the coating, or optical layers, of the present embodiments are configured to reduce Fresnel reflection of image bearing light 166 and outside world light 164 at angles close to the normal axis. In this regard, it will be seen in FIG. 10 that at angles of incidence below the critical angle, which in this example is in the range 172 below about 25°, reflectance is decreased to zero or almost zero for both p and s polarised light. Accordingly, both the image generated by the display and the outside world light appears brighter through waveguide.

Figure 11:
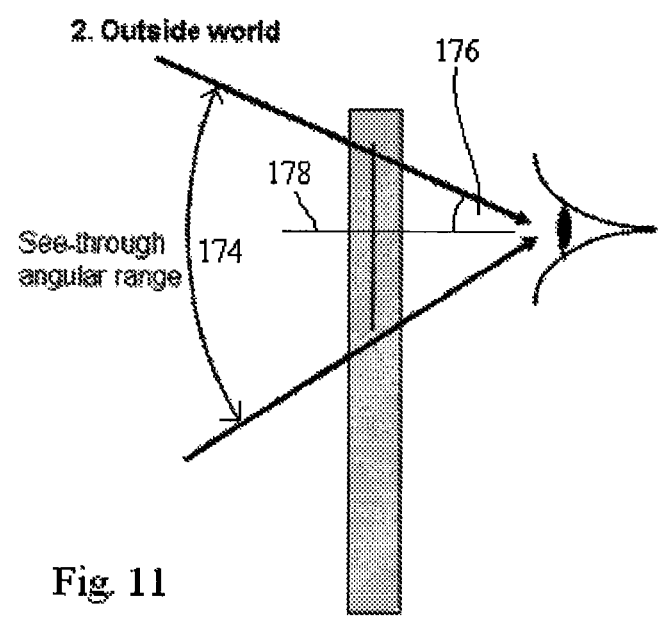
FIG. 11 illustrates schematically a required angular viewing range of an outside world scene through a waveguide.

It will be appreciated that for example when such a display is used as a head up display a viewer will need to view an outside world scene through the waveguide over a range of angles including viewing along the normal axis and at about 25° to the normal in both elevation and azimuth. The see-through angular range 174 is shown in FIG. 11 over an angle 176 to the normal axis 178. As shown in FIG. 10, the optical layer of the present embodiments provides reduced reflectance over a range of angles from 0° at the normal to about 25° at the outer limits of the angular range 174. Accordingly, the outside world scene appears brighter to a viewer across the full range of desired viewing.

Therefore, there are three requirements of the optical layers of the present embodiments. First, the critical angle of the waveguide is reduced to provide greater interactions of image bearing light with an output grating which in turn reduces exit pupil banding. Secondly, Fresnel reflections of the image bearing light output from the waveguide are reduced together with a reduction in reflections of the outside world scene. Thirdly, the light passing through the waveguide has reduced reflectance over a range of incidence angles allowing a viewer to view the outside world scene without reduced brightness.

Figure 12:
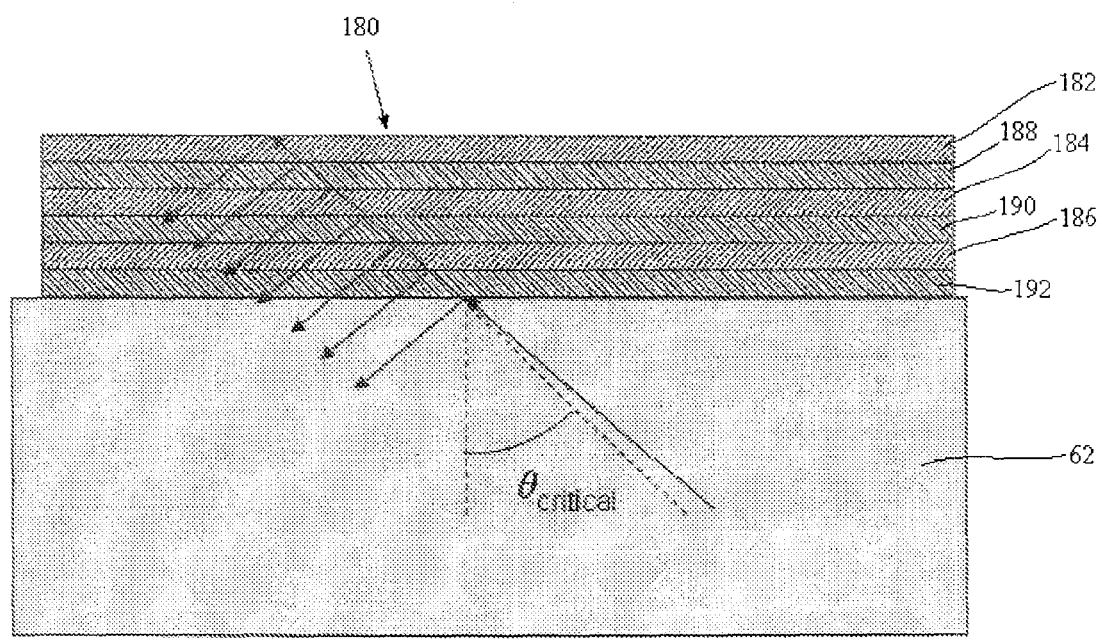
FIG. 12 shows in more detail an aspect of a waveguide embodying the invention.

A suitable optical layer for the present embodiments is shown in FIG. 12. Optical layer 180 is provided on a surface of waveguide 62 and comprises a plurality of layers. In this example, the optical layer comprises a stack of alternate layers of relatively low and relatively high refractive index material. As shown, the relatively high refractive index material layers 182, 184, 186 are made from the same material which may for example be TiO2 and the relatively low refractive index material layers 188, 190, 192 are made from the same material which may for example be MgF2. The multi-layer optical coating can be configured for optimising total internal reflection and reducing Fresnal reflections over the desired angular viewing range. Selection of coating parameters such as the number of layers, the type of dielectric material used, and thickness of each layer allows characteristics such as reflectivity to be modified. The alternating high and low index layers allows a reflection from each interface within the coating stack. The thickness of the layers is selected to produce constructive interference at angles below the critical angle of the waveguide thereby reducing the total critical angle.

Whilst FIG. 12 shows one suitable arrangement of an optical layer it will be apparent to those skilled in the art that other materials and configurations may be adopted for decreasing the critical angle of the waveguide. The FIG. 12 arrangement allows fine adjustments to be made to the optical properties of the optical layer permitting the critical angle to be selected according to requirements and for Fresnel reflection to be reduced thereby enhancing the brightness of the display. In the alternative however a single layer optical layer, which may be a thin dielectric coating, could be adopted having a refractive index which is less than the refractive index of the waveguide substrate and yet higher than the refractive index of air. Such an alternative arrangement causes refraction of the light passing through the waveguide substrate/optical layer boundary at an angle which is greater than the critical angle of the optical layer so that light undergoes total internal reflection in the optical layer and is refracted back into the waveguide substrate.

The invention claimed is:

1. A waveguide for a projection display for displaying an image to an observer, comprising:
   a substrate of light transmissive material having two opposed substantially parallel faces, the substrate of light transmissive material being arranged to transmit light within the substrate of light transmissive material, between the parallel faces, under total internal reflection, the substrate of light transmissive material having a critical angle required for total internal reflection and the substrate of light transmissive material being arranged to allow the observer to view a forward scene through the substrate of light transmissive material;
   an output grating element arranged within the substrate of light transmissive material to diffract a portion of light incident thereon out of the substrate of light transmissive to allow light exiting the substrate of light transmissive material to be viewed by the observer overlaid on the forward scene viewed through the substrate of light transmissive material and to allow a remainder of the light to be transmitted within the substrate of light transmissive material under total internal reflection; and
   an optical layer arranged on each of the parallel faces, the optical layer being arranged to reduce the critical angle required for total internal reflection of light within the substrate of light transmissive material to increase a number of interactions between light transmitted within the substrate and the output grating element.

2. A waveguide, as claimed in claim 1, comprising means for inputting light into the substrate at angles of incidence relative to the substantially parallel faces which are between a critical angle of the substrate without the optical layer and a reduced critical angle of the substrate with the optical layer.

3. A waveguide, as claimed in claim 1, wherein the optical layer is selected to reduce Fresnel reflectance of light at the faces of the substrate having an angle of incidence which is between the critical angle of the substrate with the optical layer and a normal axis when light is diffracted out of the substrate by the output grating element.

4. A waveguide, as claimed in claim 1, wherein the optical layer comprises a plurality of layers in which each alternate layer of the plurality of layers has a higher or lower refractive index with respect to an adjacent layer of the plurality of layers.

5. A waveguide, as claimed in claim 4, wherein a layer of the plurality of layers adjacent to a lower refractive index layer comprises $TiO_2$.

6. A projection display, for displaying an image to an observer, comprising:
   a first waveguide and a second waveguide both in accordance with the waveguide as claimed in claim 1;
   an image-providing light source device arranged to generate an image and to inject image bearing light into the first waveguide; a first said output grating element associated with the first waveguide arranged to direct the image bearing light internally along the first waveguide under total internal reflection and via which the image bearing light is outputted from the first waveguide;
   an input grating element arranged to receive the image bearing light from the first waveguide and to inject the image bearing light along the second waveguide under total internal reflection; and
   a second said output grating element arranged in the second waveguide to diffract received image bearing light out of the second waveguide towards an observer;
   wherein the optical layers of the first and second waveguides reduce the critical angle required for total internal reflection of image bearing light within the waveguides to increase the number of interactions between the light propagating within the first waveguide and the first output grating element and between the light propagating within the second waveguide and the second output grating element.

7. A projection display as claimed in claim 6, wherein one or more of the grating elements are holographic optical elements or semi-reflective surfaces.

8. A projection display, as claimed in claim 6, wherein the first waveguide is plate-like, the second waveguide is plate-like and the first and second waveguides are arranged substantially parallel to one another.

9. A projection display, as claimed in claim 6, wherein the first waveguide and the second waveguide are arranged substantially in the same plane.

10. A projection display, as claimed in claim 8, wherein the first waveguide and the second waveguide are formed within a single piece of material.

11. A projection display, as claimed in claim 6, wherein the first waveguide is rod-like, the second waveguide is plate-like and the first and second waveguide are arranged such the image bearing light exits the first waveguide along a longitudinal axis of the first waveguide and enters the second waveguide to propagate along a propagation axis of the second waveguide.

12. A head up display, or helmet mounted display, or head mounted display including a waveguide as claimed in claim 1.

13. A head up display, or helmet mounted display, or head mounted display including a projection display as claimed in claim 6.

14. A waveguide, as claimed in claim 4, wherein a layer of the plurality of layers adjacent to a higher refractive index layer comprises $MgF_2$.

* * * * *